(12) United States Patent
Schmidt et al.

(10) Patent No.: US 10,465,792 B2
(45) Date of Patent: Nov. 5, 2019

(54) SHIFTING DEVICE FOR AN AUTOMATIC GEARBOX OF A MOTOR VEHICLE

(71) Applicant: Küster Holding GmbH, Ehringshausen (DE)

(72) Inventors: Thomas Schmidt, Hungen (DE); Martin Blücher, Ehringshausen (DE)

(73) Assignee: Küster Holding GmbH, Ehringshausen (DE)

( * ) Notice: Subject to any disclaimer, the term of this patent is extended or adjusted under 35 U.S.C. 154(b) by 169 days.

(21) Appl. No.: 15/550,820

(22) PCT Filed: Feb. 22, 2016

(86) PCT No.: PCT/EP2016/053644
§ 371 (c)(1),
(2) Date: Aug. 14, 2017

(87) PCT Pub. No.: WO2016/135085
PCT Pub. Date: Sep. 1, 2016

(65) Prior Publication Data
US 2018/0023687 A1    Jan. 25, 2018

(30) Foreign Application Priority Data
Feb. 24, 2015   (DE) .................. 10 2015 102 607

(51) Int. Cl.
*B60K 20/00*   (2006.01)
*G05G 9/00*   (2006.01)
(Continued)

(52) U.S. Cl.
CPC ....... *F16H 59/0204* (2013.01); *F16H 59/044* (2013.01); *F16H 59/105* (2013.01); *F16H 2059/026* (2013.01); *F16H 2059/0239* (2013.01)

(58) Field of Classification Search
CPC ......... F16H 59/0204; F16H 2059/0239; F16H 2059/026; F16H 59/105; F16H 59/044
See application file for complete search history.

(56) References Cited

U.S. PATENT DOCUMENTS 5,540,180 A   7/1996  Kataumi
5,689,996 A   11/1997 Ersoy
(Continued)

FOREIGN PATENT DOCUMENTS

CN   2780532 Y   5/2006
DE   19608981 A1   9/1997
(Continued)

*Primary Examiner* — Jake Cook
(74) *Attorney, Agent, or Firm* — Rogowski Law LLC (57) ABSTRACT

A shifting device (2) for an automatic gearbox of a motor vehicle has a housing (4) and a selector lever (6) for selecting a gear stage which selector lever is guided in the housing (4). The shifting device (2) has an automatic shift gate (18) and a sequential shift gate (20), and the housing (4) has fasteners (projections and recesses) (10.2, 10.3, 10.4, 10.5) for fixing the shifting device (2) in the motor vehicle. The housing (4) can be fixed in a first position for right hand driving and in a second position which is rotated by 180 degrees relative to the first position for left hand driving. The fasteners are arranged point-symmetrically in order to rotate the shifting device (2) by 180 degrees, with the result that the respective fastening points coincide with the original fastening points after the rotation and the fasteners are fixed on in each case the same motor vehicle-side fastening points.

10 Claims, 4 Drawing Sheets

(51) Int. Cl.
    *F16H 59/02*     (2006.01)
    *F16H 59/10*     (2006.01)
    *F16H 59/04*     (2006.01)

(56) References Cited

U.S. PATENT DOCUMENTS

| | | |
|---|---|---|
| 6,386,061 B1 | 5/2002 | Giefer |
| 8,350,560 B2 | 1/2013 | Kammer |
| 2005/0193853 A1 | 9/2005 | Zelman |
| 2010/0242658 A1* | 9/2010 | Patzold ............... F16H 59/0204 74/473.24 |
| 2015/0345625 A1* | 12/2015 | Pfeifer ................ F16H 59/0217 74/473.12 |
| 2016/0273648 A1* | 9/2016 | Kato .................... F16H 59/105 |

FOREIGN PATENT DOCUMENTS

| | | |
|---|---|---|
| DE | 19853934 B4 | 5/2000 |
| DE | 102008028618 B3 | 11/2009 |
| EP | 0622572 A1 | 11/1994 |

\* cited by examiner

SHIFTING DEVICE FOR AN AUTOMATIC GEARBOX OF A MOTOR VEHICLE

CROSS-REFERENCE TO RELATED APPLICATIONS

This application is a national stage application (under 35 U.S.C. § 371) of PCT/EP2016/053644, filed Feb. 22, 2016, which claims benefit of German application No. 10 2015 102 607.4, filed Feb. 24, 2015, the contents of each of which are incorporated by reference herein.

BACKGROUND OF THE INVENTION

Technical Field and State of the Art

The invention relates to a shifting device for an automatic transmission of a motor vehicle, comprising a housing and a gear selector lever that is accommodated in the housing. The gear selector lever can be used to select a gear of the automatic transmission. Here, the shifting device has two shift gates, one of which is an automatic shift gate while the other is a sequential shift gate. The housing of the shifting device has fastening means to affix the shifting device in the motor vehicle. The fastening means are arranged in such a way that the housing can be affixed in a first position as well as in a second position that is rotated by 180° relative to the first position.

Shifting devices of the above-mentioned type are known from the state of the art.

Since there are countries with right-hand traffic as well as countries with left-hand traffic, motor vehicles are designed as vehicles with the steering wheel on the left and with the steering wheel on the right. This means that the interior has to be designed in two different versions, namely, one for left-hand drive vehicles and one for right-hand drive vehicles. In this context, car manufacturers strive to use as many identical parts as possible in both variants in order to keep the development and component costs as low as possible.

However, there are ergonomic considerations which require that certain functions be arranged mirror-symmetrically for these two variants. One of these functions relates to the configuration of a gear selector lever device with two shift gates. Thus, from an ergonomic standpoint, in shifting devices with two shift gates, it can be necessary for the appertaining shift gates in left-hand drive vehicles as well as in right-hand drive vehicles to be in the same position relative to the driver. In other words, if the automatic shift gate is to be positioned closer to the driver, then this applies to both orientations. Then, the sequential shift gate should be positioned further away from the driver in both variants. Of course, the same applies to the reverse ergonomic considerations.

German patent specification DE 198 53 934 B4 discloses a shifting device for an automatic transmission with sequential shifting capability in which a gear selector lever can be moved in an automatic shift gate in order to select automatic gears, and in at least one sequential shift gate for purposes of upshifting and downshifting gears, whereby the shifting device has three adjacent movement spaces oriented parallel to, each other in which the gear selector lever can be moved, whereby the middle movement space is intended for the selection of the automatic gears while the two adjacent movement spaces are intended as alternative sequential shift gates with an, identical shifting function for left-hand drive, and right-hand drive vehicles. The adaptation to the specific use as a left-hand drive vehicle or as a right-hand drive vehicle is then made by means of an appropriately adapted shift gate link which does not allow shifting into one of the two outermost shift gates, but rather only allows a movement of the gear selector lever between the automatic shift gate and one of the two sequential shift gates.

A drawback of this state of the art is that the shifting device requires a relatively large amount of space. The shifting device has, in fact, to provide three shift gates, even though only two of them can be used in any given configuration. In each case, the third shift gate remains unutilized at all times.

German patent application DE 196 08 981 A1 discloses a shifting device for the transmission of motor vehicles, this device having a housing and a gear selector lever. Here, sensors are provided so that a signal corresponding to the shifting position of the gear selector lever can be transmitted to a control unit of the transmission. In the vehicle crosswise direction, the shifting axis is positioned orthogonally to the selecting axis in the vehicle lengthwise direction. whereby the gear selector lever is mounted so as to pivot around bath axes. A disadvantage here is especially the fact that the shifting device is not suitable for installation in left-hand drive vehicles and right-hand drive vehicles since the gears that are to be selected would be defined contrary to the familiar shifting patterns.

German patent specification DE 10 2008 028 618 B3 discloses an electromechanical transmitter for purposes of controlling at least one function of a transmission which is arranged physically remotely and which has an actuatable lever that can be pivoted and that is mechanically uncoupled from the transmission that is to be activated. Rotational angle sensor elements serve to ascertain the angular position of the lever. The transmitter, however, is not optimized in terms of its requisite installation space while, at the same time, being suitable for both left-hand drive and right-hand drive motor vehicles.

SUMMARY OF THE INVENTION

Before this backdrop, an objective of the invention is to refine a shifting device for an automatic transmission of the above-mentioned type so that it can be employed for left-hand drive as well as for right-hand drive vehicles, while requiring less installation space than prior-art shifting devices and so that its costs can be kept down by making use of a large number of identical parts.

A shifting device according to a first embodiment of the invention for the automatic transmission of a motor vehicle has a housing with which the shifting device can be affixed in the motor vehicle. Inside the housing, there is a gear selector lever that is provided for selecting a gear of the automatic transmission.

The shifting device has an automatic shift gate and a sequential shift gate. The automatic shift gate allows the selection of a given driving gear, for instance, drive, reverse or else the neutral or park positions. The sequential shift gate can be provided to allow the manual selection of a driving gear of the automatic transmission, whereby it is possible to upshift as well as to downshift sequentially. As a rule, different shifting directions are provided for both shifting procedures, for example, upshifting towards the rear and downshifting towards the front or vice versa.

If a link guide has been provided for the gear selector lever, the two shift gates can be connected via a connecting gate.

The shift gates can be defined, for instance, by means of a link guide. As an alternative or in addition, the gear selector lever can be installed on a latching plate that has latching points and/or guide tracks.

It is likewise provided that the fastening means on the housing are arranged in such a way that the housing can be affixed in a first position as well as in a second position that is rotated by 180° relative to the first position. The rotational axis around which the shifting device is moved from the first position into the second position is defined in such a way that the driver can still operate the gear selector lever in both positions, in other words, it does not project inwards. Such rotational axes can be oriented largely or completely perpendicular to the possible movements of the gear selector lever. In embodiments in which the gear selector lever has a guide rod, the rotational axis can coincide largely or completely with the direction in which the gear selector lever extends.

In this context, the fastening means are affixed to the vehicle at the same fastening points. As a result, the appertaining substructure for the fastening means can be configured identically for both variants, i.e. for right-hand drive vehicles as well as for left-hand drive vehicles.

A shifting device configured in such a manner can be used for right-hand drive vehicles as well as for left-hand drive vehicles since the shifting device can be installed in the one orientation or in the other orientation, depending on whether it is for a left-hand drive or right-hand drive vehicle. Consequently, at least the same housing can be employed for both variants, thus increasing the number of identical parts and reducing the requisite model variants.

It is also provided according to the invention that the fastening means for rotating the shifting device by 180° are arranged point-symmetrically so that the individual fastening points coincide with the original fastening points after the rotation and the fastening means are each affixed to the same fastening points on the motor vehicle.

In this context, it is advantageous that the rotational axis for moving the shifting device from the first position into the second position is defined in such a way that the driver can still operate the gear selector lever in both positions, in other words, it does not project inwards. Since the fastening means are each affixed to the motor vehicle at the same fastening points, the appertaining substructure can be configured identically for both fastening variants, i.e., for right-hand drive vehicles as well as for left-hand drive vehicles. As a result, the shifting device, can be used for right-hand drive vehicles as well as for left-hand drive vehicles. After all, depending on whether the motor vehicle in question is a left-hand drive vehicle or a right-hand drive vehicle, the shifting device can be installed in the one orientation or in the other orientation. Consequently, at least the same housing can be employed for both variants, thus increasing the number of identical parts and reducing the requisite model variants.

In a first refined embodiment, it can be provided for the fastening means to, be arranged on fastening projections. The fastening projections can be configured so as to protrude from the housing. This makes it easier to affix the housing in the vehicle in different positions,. Each of the fastening projections can have one or more fastening means so that all of the fastening means can be arranged on a shared fastening projection, for example, on a fastening collar. The fastening collar can form a fastening bracket.

In another possible embodiment, it can be provided for the gear selector lever to have a middle position that coincides with the center of symmetry of the point symmetry. In this manner, the gear selector lever has the same relative position, irrespective of the position in which the shifting device was installed. This makes it possible to position the gear selector lever in the same place in both orientations, so that there are no ergonomic differences for right-hand drive or left-hand drive vehicles.

In another possible embodiment of the shifting device, it can be provided for the middle position to be monostable. This means that the gear selector lever always—or at least when it is in the automatic shift gate—automatically returns or is returned to the middle position after being released.

In some embodiments, the sequential shift gate can have a second stable position to which the gear selector lever returns after having been actuated. Monostability can be achieved, for instance, by elastic or resilient elements or by a return motor.

Another possible embodiment of the shifting device provides for a gear selector lever sensor system that detects the position and/or the movements of the gear selector lever. The information provided by the gear selector lever sensor system can be utilized for various purposes. On the one hand, on the basis of the appropriate information, the selection data can be registered for an on-board computer so that the selected driving gear can be shown, for example, on a display. On the other hand, if the gear selector lever is not mechanically coupled to the automatic transmission, control signals can be generated by means of which a servomotor on the automatic transmission can then engage the desired driving gear.

In one embodiment, such a gear selector lever sensor system can be configured with magnets and Hall sensors. A Hall sensor can detect the position of a magnet relative to the sensor by measuring the magnetic field strength of the magnet. The directions of movement can also be detected in a practical manner by arranging two or more Hall sensors. The Hall sensor(s) can be affixed to the housing, in contrast to which the magnet(s) can be associated with the gear selector lever so that they move when the gear selector lever is moved. This causes the magnets to move past the Hall sensor(s) when the gear selector lever is being moved, as a result of which the field strengths on the Hall sensor(s) change.

In such an arrangement, the sensor system can distinguish between the two shift gates on, the basis of the distance of the magnet(s) relative to the sensor(s) Due to a larger distance in the shift, gate that is further away, the field strength on the sensor(s) is less.

Such a sensor system can especially be combined with gear selector levers that are mounted so as to be monostable and that are always in the same position when in the resting state or else, depending on the configuration, assume one of two preferential positions (duo-stable) and are deflected out of this or these position(s) in order to select the gear.

In a refined embodiment, the gear selector lever sensor system can be connected to a control unit whereby the control unit is designed to interpret movements and/or positions of the gear selector lever relative to the installation, position. The control unit can interpret the signals of the sensor system and, on this basis, can generate control and/or status signals that can be output to the outside by the shifting device.

In some embodiments, the control unit can also assume additional functions. Such functions can include controlling servomotors that might have been provided in the shifting device and that serve to move the gear selector lever and/or to lock it in place.

The control unit can be arranged in or on the shifting device. In other embodiments, the control unit can also be arranged separately.

A refined aspect of the shifting device can provide that the control unit has storage means that serve to store a computer program product. Moreover, a processor can be provided that serves to execute the computer program product. In this context, it is provided for the computer program product to be adapted to the installation direction of the shifting device. Owing to the installation option in positions that are rotated by 180° with respect to each other, the specific actuation directions are rotated relative to the shifting device and thus a precisely opposite interpretation is needed.

The computer program product can be adapted to the installation direction in various manners. On the one hand, an automatic identification of the installation direction can be provided so that the computer program product automatically detects relevant information that is to be interpreted precisely in the opposite way, depending on the installation direction of the shifting device.

In another embodiment, the computer program product can be programmed in such a way that it has appropriate subprograms for both installation directions. The installation direction can then be ascertained by means of configuration files. The configuration files can be stored in the storage unit or else they can be retrieved from the motor vehicle having a vehicle control unit in which information about the vehicle, including whether it is a left-hand drive or right-hand drive vehicle, can have been stored.

In a third variant, the computer program product can be designed specifically for a given installation direction, whereby, depending on the installation direction in question, the appropriate computer program product is downloaded into the storage unit.

In another possible embodiment of the shifting device, there can be mechanical locking means for the gear selector lever in order to affix the gear selector lever outside of the middle position of the gear selector lever. Some car manufacturers desire this in order to make the locking of the gear selector lever visible from the outside. As a rule, this position will then be the same for both installation variants relative to the motor vehicle, in other words, for left-hand drive and right-hand drive vehicles. For instance, in each case, the gear selector lever should be locked in a position that is tilted towards the front relative to the middle, position.

Consequently, counter-locking means on the gear selector lever such as, for example, recesses, have to be located off-center relative to the locking means on the housing. If, as described above, the locking direction should coincide, for instance, with the driving direction of the motor vehicle, the locking position of the gear selector lever would then be the position tilted towards the front.

If the shifting device has to be installed so as to be rotated by 180°, this would mean, that the gear selector lever would be locked in the position that is tilted towards the rear relative to the driving direction, something which is not desirable.

For this reason, in the case of the off-center locking variant, the counter-locking means of the gear selector lever have to be configured so as to take the installation direction of the shifting device into consideration. For this purpose, in one variant, the counter-locking means could be provided on both sides of the gear selector lever. The counter-locking means can also be dimensioned in such a way that they can work in both directions. Then, the orientation of the gear selector lever can be checked before the gear selector lever is locked in place in order to ensure that the gear selector lever 6 is in the correct locking position.

In another variant, this aspect can be taken into consideration by using a gear selector lever that is adapted to the installation direction. The gear selector lever can have appropriate locking means that interact with the locking means on the housing and that are situated at, the appropriately matching positions. Thanks to the use of the appropriately adapted gear selector lever, the construction resources needed for the left-hand drive and the right-hand drive variants is kept to a minimum.

In a possible embodiment, a section of the gear selector lever that projects into the housing for the first installation direction can be mirror-symmetrical to the corresponding section of the gear selector lever in the second installation direction. Owing to this appropriate mirror symmetry, the locking means on the gear selector lever can be moved into the correct position relative to the locking means on the housing.

Additional objectives advantages, features and application possibilities of the present invention ensue from the description below of an embodiment with reference to the drawing, in this context, all of the described and/or depicted features, either on their own or, in any meaningful combination, constitute the subject matter of the present invention, also irrespective of their compilation in the claims or the claims to which they refer back.

DESCRIPTION OF THE DRAWINGS

The invention will be elaborated upon on the basis of an embodiment. The following is shown schematically here.

DETAILED DESCRIPTION

Figure 1:
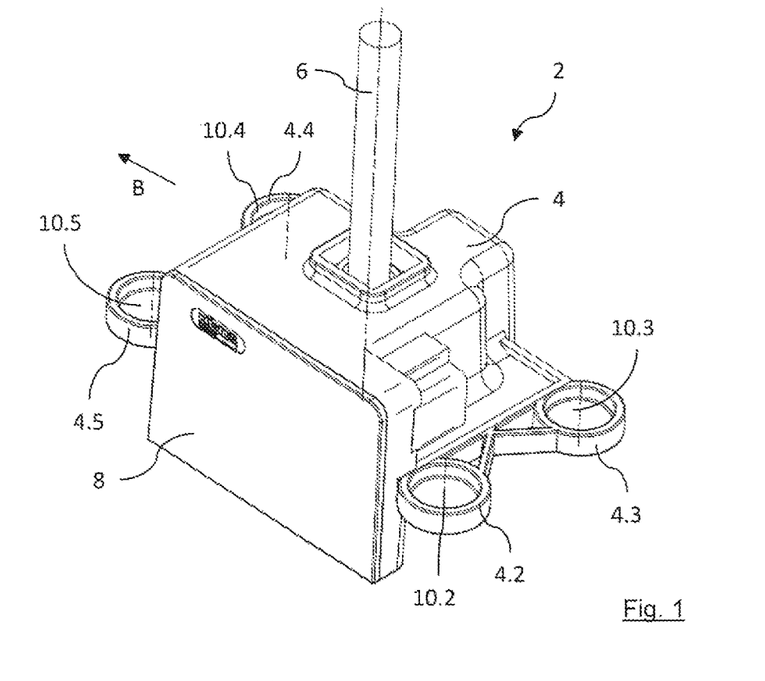
FIG. 1 a perspective view of the shifting device for an automatic transmission of a motor vehicle.

FIG. 1 shows a schematic perspective view of a shifting device 2 for an automatic transmission of a motor vehicle.

The shifting device has a housing 4. An opening 4.1 that protrudes from the gear selector lever 6 is provided on the housing 4. The gear selector lever 6 serves to select a gear of the automatic transmission.

FIG. 1 shows a reference direction B which, as a function of the installation direction, can be in the front or at the rear. Depending on the configuration, a movement of the gear selector lever 6 in the direction B or counter to the direction B determines various driving gears, for instance, drive, reverse, neutral or park.

Moreover, the gear selector lever 6 can be moved in a direction perpendicular to B in order to be moved into a sequential shift gate. In this sequential shift gate, in turn, a movement of the gear selector lever 6 in the direction 8 or counter, to direction B can bring about an upshifting or downshifting.

The gear selector lever 6 is shown in its middle position. The middle position is primarily bi-stable. The gear selector lever 6 returns automatically to the middle position after being deflected out of the automatic shift gate towards direction B or else counter to direction B. In the sequential shift gate, there is another stable point to which the gear selector lever 6 returns after being actuated. The middle position, however, is the initial position.

The housing 4 is adjoined by a printed circuit board 8 that comprises control electronics as well as a sensor system. One or more connections that serve to supply the shifting device 2 with power as well as to transmit shifting pulses can also be arranged on the printed circuit board 8.

The housing 4 has fastening projections 4.2 to 4.5. Recesses 10.2 to 10.5 are formed on each of the fastening projections 4.2 to 4.5. The shifting device 2 can be affixed in the motor vehicle by means of the recesses 10.2 to 10.5, for example, using appropriate screws. As an alternative, it can be provided that the motor vehicle has stud bolts onto which the shifting device 2 with the recesses 10.2 to 10.5 is placed and subsequently affixed, for instance, by means of screws or clamps.

Figure 2:
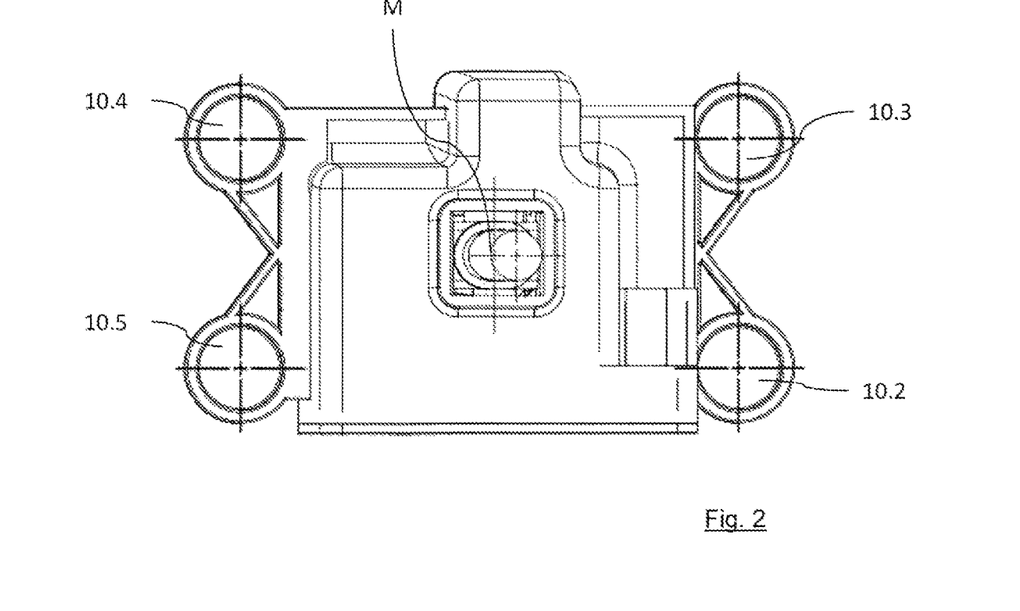
FIG. 2 a top view of the shifting device.

FIG. 2 shows a top view of the shifting device 2.

The recesses 10.2 to 10.5 are configured so as to be circular and each have centers indicated by crossed lines. The recesses 10.2, to 10.5 are arranged on the housing in such a way that the latter can be installed once in the depicted orientation facing the reference direction B and once in a position that is rotated in the drawing plane by 180° relative to the reference direction B.

In the embodiment shown, the recesses 10.2 to 10.5 are arranged rotation-symmetrically around the point M. At the same time, M is the middle position of the gear selector lever 6, which in FIG. 2 is depicted with an offset relative to the middle position M.

Figure 3:
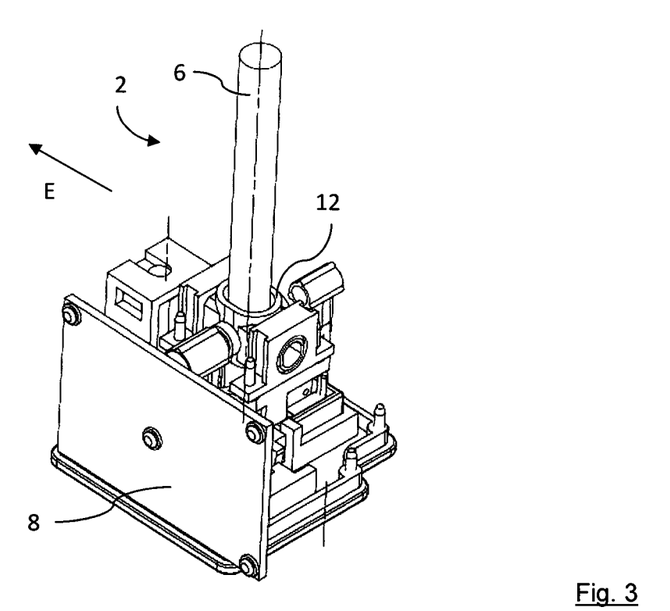
FIG. 3 a perspective view of the shifting device without an outer housing.

FIG. 3 shows a perspective view of the shifting device 2 without a housing.

The gear selector fever 6 is guided by means of a universal joint 12. The universal joint 12 can move the gear selector lever 6 in various directions.

For the sake of clarity of the other parts the control unit is not shown. In this context, see FIG. 7.

Figure 4:
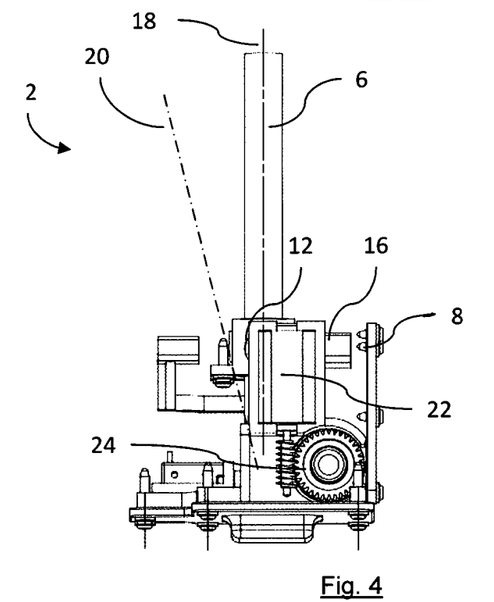
FIG. 4 a side view of the shifting device without a housing.

FIG. 4 shows a side view of the shifting device 6 counter to the viewing direction B.

Hall sensors 14 that detect the magnetic field of magnets 16 arranged on the universal joint 12 are arranged on the printed circuit board 8. The magnet 16 is likewise moved along whenever the gear selector lever 6 is moved. The position and the movement of the magnet 16 relative to the Hall sensors 14 can be detected by the latter. In this manner, it is possible to ascertain whether the gear selector lever 6 is being moved towards or counter to the reference direction B and what its current position is.

The gear selector lever 6 in the depiction shown in FIG. 4 is in an automatic shift gate that is indicated by the line 18. The gear selector lever 6, however, can also be pivoted to a sequential shift gate 20. Pivoting the gear selector lever 6 also changes the distance of the magnet 14 from the Hall sensor 14. Therefore, the detected field strengths in the resting position as well as during the movement are weaker at the Hall sensor 14, as a result of which the latter can register the position of the gear selector lever 6 in the sequential shift gate 20.

A servomotor 22 is also provided which can have various functions and which can be operated by means of a worm gear pair with which an eccentric (not shown in this depiction). The eccentric can serve, for instance, to prevent the gear selector lever 6 from moving into the sequential shift gate 20. It is likewise possible to press the gear selector lever 6 back into the automatic shift gate 18 whenever necessary.

Figures 5, 6:
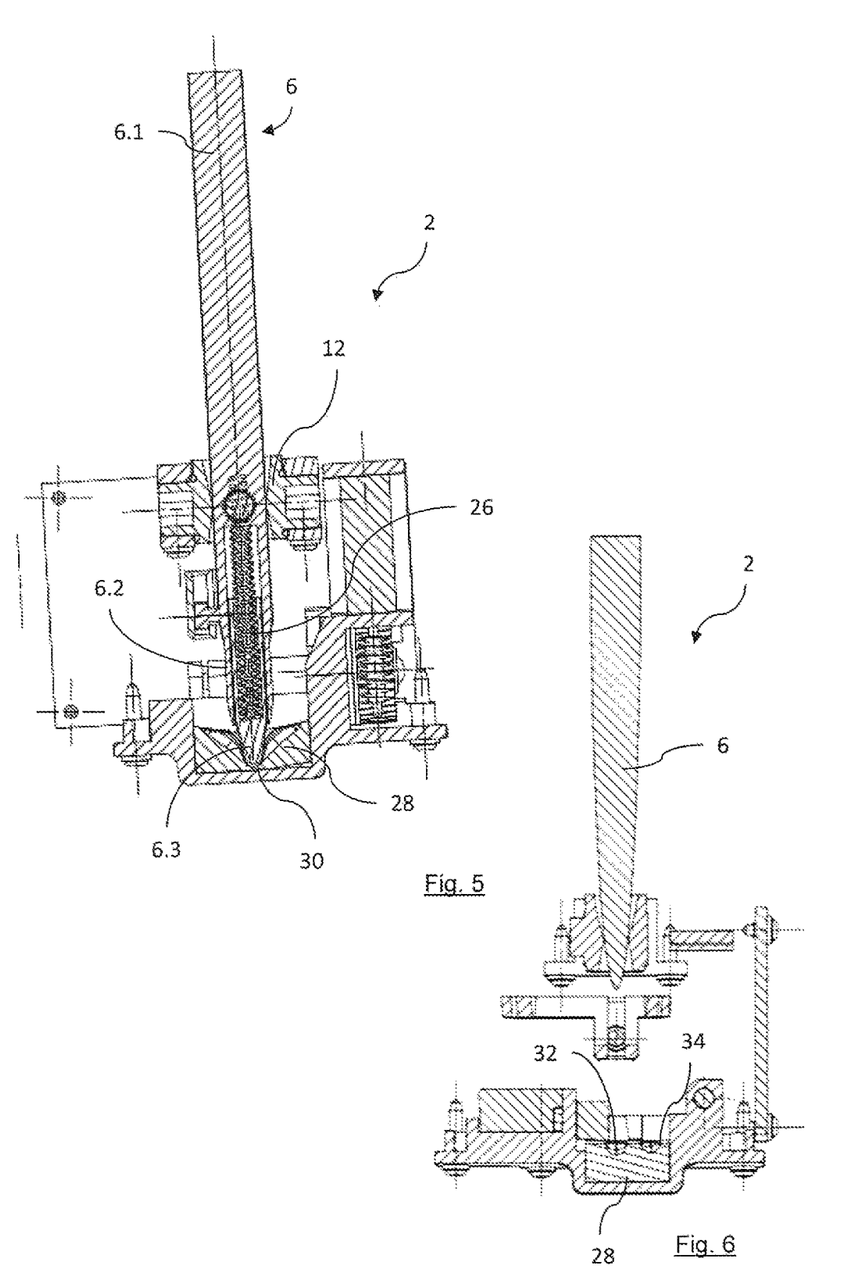
FIG. 5 a sectional view through the shifting device without a housing.
FIG. 6 another sectional view through the shifting device without a housing.

FIG. 5 shows a sectional view through the shifting device 2.

The gear selector lever 6 has a part 6.1 that is stationary relative to the universal joint 12 as well as a lower part 6.2 that is movable relative to the universal joint 12 and that has a tip 6.3. Between the stationary part 6.1 and the movable part 6.2, there is a spring 26 that pretensions the movable part 6.2 downwards.

The tip 6.3 is inserted into a guide plate 28. The guide plate 28 has a depression 30 that is visible in a sectional view and that forms a latching resistance. The depression 30 defines the middle position M of the gear selector lever 6. The magnitude of the resistance is determined, on the one hand, by the contour of the tip as well as by the depression and, on the other hand, by the strength of the spring 26.

FIG. 6 shows another sectional view through the shifting device 2, whereby the section was drawn through a slanted gear selector lever 6.

Two tracks 32, 34 are provided in the guide plate 28, whereby the track 32 is intended for the automatic shift gate 18 while the track 34 is intended for the sequential shift gate 20. The tip 6.3, which is not visible in FIG. 6, passes through the tracks 32, 34.

Figure 7:
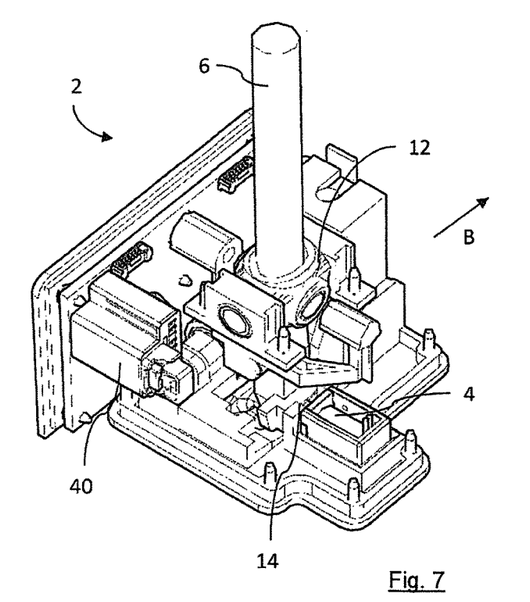
FIG. 7 a perspective view of the shifting device without an outer housing, with a locking means.

FIG. 7 shows a perspective view of the shifting device 2 without an outer housing, with a locking means.

In the shifting device 2, there is a locking element 36 on the housing side and it can be actuated by means of a lifting magnet 38. In the embodiment shown, the lifting magnet 38 and the locking element 36 are arranged coaxially to an axis of the universal joint 12 for purposes of optimizing the installation space. Different configurations can be provided in other embodiments.

The locking element 36 can interact mechanically with the gear selector lever 6 and, by means of this interaction, can block the gear selector lever 6 when it is in the middle position M. For this purpose, counter-locking means (not shown in FIG. 7) are provided on the gear selector lever 6 that have to engage when the gear selector lever 6 is in the middle position.

Moreover, a control unit 40 with a storage means and a processor is shown which serves to control the shifting device 2. The control unit 40 can evaluate signals of the Hall sensors 14 and can then actuate the drives 22 and 38 in the shifting device 2.

A computer program that serves to control the shifting device and that is executed by the processor is stored in the storage means of the control unit. The computer program takes into account the installation orientation in order to derive appropriate control commands for the automatic transmission on the basis of the concrete movements of the gear selector lever 6 relative to the Hall sensors 14. In this case, the installation direction is stored in a configuration file.

Figure 8:
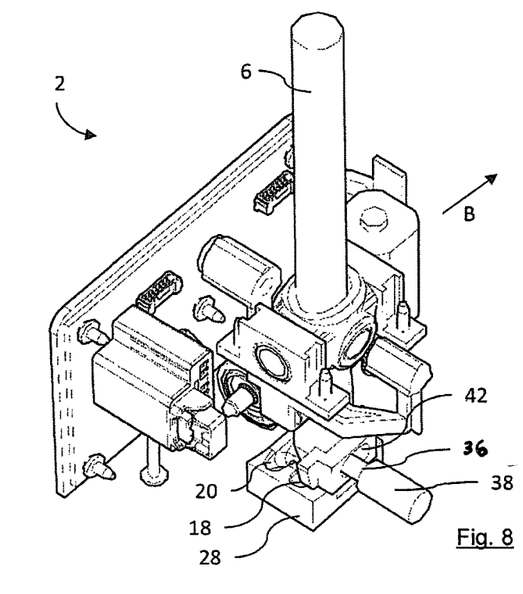
FIG. 8 a perspective view of the shifting device without an outer housing according to FIG. 7, with a released locking means.

FIG. 8 shows a perspective view of the shifting device 2 without an outer housing, with a released locking means.

In this second depiction, the locking element 36 is engaged with a recess 42 that is configured as a counter-locking means on the gear selector lever 6.

Moreover, FIG. 8 shows the guide plate 28 with the automatic shift gate 18 and the sequential shift gate 20.

Figure 9:
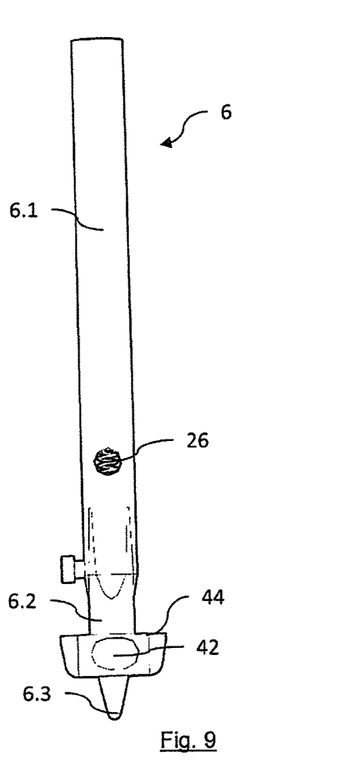
FIG. 9 a gear selector lever.

FIG. 9 shows, a gear selector lever 6 separated from the other parts. The movable part 6.2 has a hammerhead 44 on which the recess 42 is arranged.

In one variant where the locking of the gear selector lever 6 is to take place off-center and where the locking means arranged on the housing is arranged in one line with the universal joint, the recess would have to be located off-center. Then specific gear selector lever variants would have to be provided for each installation direction.

LIST OF REFERENCE NUMERALS 2 shifting device
4 housing
4.1 opening
4.2-4.5 fastening projections
6 gear selector lever
6.1 gear selector lever part
6.2. movable gear selector part
6.3 tip
8 printed circuit board
10.2-10.5 recesses
12 universal joint
14 Hall sensors
16 magnet
18 automatic shift gate
20 sequential shift gate
22 drive
24 worm gear pair
26 spring
28 guide plate
30 depression
32 track
34 track
36 locking element
38 lifting magnet
40 control unit
42 recess
B reference direction
M middle position

The invention claimed is:

1. A shifting device for an automatic transmission of a motor vehicle, comprising:
a housing for a gear selector lever of the automatic transmission, said housing having a first bracket depending therefrom in a first direction and defining first and second fastening projections for connecting the housing to the motor vehicle, and having a second bracket depending therefrom in a second direction that is 180 degrees opposite from the first direction and defining third and fourth fastening projections for connecting the housing to the motor vehicle;
wherein the housing is adapted for connection to the motor vehicle in a first orientation by connecting the first, second, third and fourth fastening projections to the motor vehicle to accommodate moving the gear selector lever for right-hand driving, and is further adapted for connection to the motor vehicle in a second orientation 180 degrees rotated from the first orientation by connecting the first, second, third and fourth fastening projections to the motor vehicle to accommodate moving the gear selector lever for left-hand driving; and
wherein the housing further comprises an automatic shift gate and a sequential shift gate each adapted to receive the gear selector lever in relation to whether automatic transmission or manual transmission shifting is selected, said gear selector lever pivotable from the automatic shift gate into the sequential shift gate, wherein the automatic shift gate and the sequential shift gate in the first orientation are configured symmetrically to the automatic shift gate and to the sequential shift gate in the second orientation relative to a center of symmetry of the point symmetry.

2. The shifting device of claim 1, wherein in the first orientation for right-hand driving, the first and second fastening projections are connected to first and second fastening points of the motor vehicle, and the third and fourth fastening projections are connected to third and fourth fastening points of the motor vehicle, and in the second orientation for left-hand driving, the first and second fastening projections are connected to the third and fourth fastening points of the motor vehicle, and the third and fourth projections are connected to the first and second fastening points of the motor vehicle.

3. The shifting device according to claim 1, wherein the gear selector lever has a middle position (M) that coincides with the center of symmetry of the point symmetry.

4. The shifting device according to claim 3, wherein the middle position (M) is monostable.

5. The shifting device according to claim 1, further comprising a gear selector lever sensor system to detect the position of the gear selector lever.

6. The shifting device according to claim 5, further comprising a control unit that is connected to the gear selector lever sensor system, wherein the control unit is adapted to interpret movements of the gear selector lever.

7. The shifting device according to claim 3, further comprising a locking element for the gear selector lever in order to affix the gear selector lever outside of the middle position (M) of the gear selector lever.

8. The shifting device according to claim 7, further comprising a lifting magnet to actuate the locking element.

9. The shifting device according to claim 1, wherein the gear selector lever has a first section that projects into the housing when the housing is installed in the first orientation, and the gear selector lever has a second section that is is mirror-symmetrical to the first section that projects into the housing when the housing is installed in the second orientation direction.

10. The shifting device according to claim 7, further comprising a second locking element for the gear selector lever in order to affix the gear selector lever outside of the middle position (M) of the gear selector lever in a direction opposite of affixation by the locking element.

* * * * *